United States Patent [19]
Rosenberg

[11] Patent Number: 5,484,240
[45] Date of Patent: Jan. 16, 1996

[54] RELEASABLE, MODULAR, MULTI-USE FASTENER FOR VEHICLES

[76] Inventor: Gary F. Rosenberg, 1532 B Virginia St., Berkeley, Calif. 94703

[21] Appl. No.: 299,521

[22] Filed: Sep. 1, 1994

[51] Int. Cl.⁶ .................................................. B61D 45/00
[52] U.S. Cl. ............................. 410/110; 296/43; 410/106
[58] Field of Search .......................... 410/9 B, 106–110, 410/115; 296/43; 24/287, 457, 458, 461, 201, 223

[56] References Cited

U.S. PATENT DOCUMENTS

| | | |
|---|---|---|
| 1,454,251 | 5/1923 | Powell . |
| 1,652,575 | 12/1927 | McGinley . |
| 3,421,726 | 1/1969 | Getter ................................. 410/110 |
| 3,504,875 | 4/1970 | Johnson et al. . |
| 3,838,802 | 10/1974 | Grycel, III ............................ 24/221 |
| 3,841,695 | 10/1974 | Woodward ............................ 296/43 |
| 4,231,606 | 11/1980 | Tuerk ................................... 296/43 |
| 4,274,181 | 6/1981 | Schaller ............................... 24/223 |
| 4,316,688 | 2/1982 | Roskelley ............................ 410/107 |
| 4,782,561 | 11/1988 | Hayama ............................... 24/287 |
| 4,915,556 | 4/1990 | Unger .................................. 410/110 |
| 4,958,875 | 9/1990 | Zamzow .............................. 410/110 |

FOREIGN PATENT DOCUMENTS

131338  7/1985  Japan ................................. 410/107

Primary Examiner—Michael S. Huppert
Assistant Examiner—Gregory A. Morse
Attorney, Agent, or Firm—Klein & Vibber

[57] ABSTRACT

A releasable, modular, multi-use fastener which has a post unit of non-circular cross-section which is rigidly secured to a vehicle. The post unit has a frusto-pyramidically shaped top portion in which an axially disposed a cavity is adapted to receive the widened portion of a locking bayonet. A catch unit having a cavity, which is matingly shaped relative to the post unit, can be mounted on the post unit via a lateral opening. The top wall of the catch unit has a blind bore in which the locking bayonet is slidably mounted. A member can be attached to the vehicle by extending the post unit through an opening in the member and then laterally positioning the catch unit on the post unit in such a way that the lower, widened portion of the locking bayonet can be slidably inserted into the cavity in the pyramidically-shaped top portion of the post unit.

8 Claims, 8 Drawing Sheets

RELEASABLE, MODULAR, MULTI-USE FASTENER FOR VEHICLES

BACKGROUND-FIELD OF INVENTION

This invention relates to a fastener and more particularly to such a fastener for detachably securing a variety of items including tool boxes, assorted cleats and the like for belaying ropes and the like, blocks, and the like, camper shells, seats, brackets, racks for transporting a variety of items, and the like either individually or in combination to various types of vehicles such as trucks, and the like, automobiles, boats, airplanes, railroad cars, military vehicles, dog sleds, and any similar types of vehicles drawn by beasts of burden, and the like. The fastener of this invention comprises a plurality of cooperating parts designed to be lockably assembled and adapted to be fixed to a vehicle in a more or less permanent manner.

In the case of a number of the aforementioned different types of vehicles it is the practice to secure the aforementioned items, brackets, blocks, and the like, and cleats and the like for the purpose of belaying ropes and the like. However, such a practice, when accomplished by traditional means, often times results decreasing a vehicle's maximum utility.

The prior art devices used for securing the aforementioned items are limited to a singular use, or single class of uses. For example, such fastening devices are used for securing a particular bracket onto a vehicle to which thereon can be attached an assortment of devices which thereby enable the user to secure sporting equipment such as bicycles, skis, and kayaks to the vehicle.

Another traditional practice is to secure to vehicles some of the aforementioned items, specifically tool boxes, brackets, and the like, camper shells, and the like by means of sheet metal screws and special tools. Securing by this means requires drilling through the outer layers of protective paint, the protective anti-corrosion undercoating, and the sheet metal, or other compounds of which vehicles are constructed, thereby permanently damaging the vehicle and decreasing both the aesthetic appearance and the resale value thereof.

The prior art devices have the inherent disadvantage of limits imposed on securing items, brackets, cleats, and the like, blocks, and the like, either interchangeably or in combination.

SUMMARY OF THE INVENTION

The primary object of the invention is, therefore, to provide an improved releasable, modular, multi-use fastener for vehicles which enables the user to interchangeably secure a variety of items, brackets, racks, and the like, cleats and the like, blocks, and the like both individually and in combination.

Another object of the invention is to provide a means whereby other standard, commonly available items and assorted brackets can be quickly and easily secured to and removed from vehicles with none or only minor modifications to existing designs thereof.

Yet another object of the invention is to provide a means, in conjunction with a standard, commercially widely-available bed lining device, whereby camper shells, and the like, tool boxes, and the like, seats, and a variety of brackets, which are traditionally secured by means of sheet metal screws and special tools, can be secured without undesirable permanent damage to vehicles.

Yet another object of the invention is provide a releasable, modular, multi-use fastener such that said items, said brackets, said blocks, and the like, said cleats, and the like can be secured and released either individually or in different combinations quickly without the use of special tools.

Yet another object of the invention is to provide a releasable, modular, multi-use fastener having a first unit, a post, said post being configured in any one of a variety of non-cylindrical shapes having a predetermined number of sides, said sides having integral to them grooves of equal dimensions capable of receiving a series of tracks integral to a second unit, a catch. Said post having a head portion, said head portion being formed by a plurality of angled surfaces above said grooves which angle inward and upward forming a frusto-pyramidal shape. Said head portion also having integral to it a cavity, said cavity being capable of receiving in a vertically slidable manner a locking bayonet integral to said catch unit. Said post unit can be more or less permanently affixed to a floor, wall, or the like of a vehicle and can be so constructed and arranged so as not be rendered dysfunctional by damage during periods of disuse. Said catch unit having a receiving cavity formed by a top wall, said top wall having an underside, a periphery, a plurality of lateral walls which extend downward along said periphery, and where absent a laterally-facing mouth. Said plurality of lateral walls each having an inner side which angles inward and upward toward said underside of said top wall so as to form a frusto-pyramidically shaped mating cavity capable of receiving said head portion. A blind bore through said top wall receives a locking bayonet integral to said catch unit which is coaxially aligned with said cavity in said head portion of said post unit when the cooperating members are in assembly. Said plurality of lateral walls each having an inwardly extending track. Said cavity being designed and constructed to accommodate said head when inserted with a lateral motion such that when said post unit and said catch unit are in assembly, said locking bayonet is received into said cavity thereby preventing said units from unintentionally becoming disassembled. Said assembled units being quickly and easily disassembleable by manually removing said locking bayonet from within said cavity in said post unit.

Yet another object of the invention is that said catch unit is designed and constructed as previously described such that the lower periphery surface thereof angles downward toward a base of said post unit, away from said laterally-opening mouth toward the most opposite of said plurality of lateral walls, such that the action of laterally inserting said head portion of said post unit into said cavity through said laterally-facing mouth and thereby assembling said post unit and catch unit simultaneously exerts a downward force on items being secured by means of the fastener.

Yet another object of the invention is to provide a releasable, modular, multi-use fastener which during periods of disuse does not incumber the aesthetic appearance or overall functionality of a vehicle.

Yet another object or the invention is to provide a releasable, modular, multi-use fastener for securing of an assortment of cleats and the like for belaying ropes and the like to vehicles such that these cleats and the like can be quickly secured and be prevented from all vertical, horizontal, and lateral movement and easily removed during periods of disuse.

Yet another object of the invention is to provide a releasable, modular, multi-use fastener which is simple in design, sturdy in construction, inexpensive to manufacture and trouble-free in operation.

The invention resides in a releasable, modular, multi-use fastener for securing tool boxes, an assortment of cleats, and the like, blocks, and the like, camper shells, seats, racks for securing a variety of items, and the like either individually or combination to various types of vehicles such as trucks, and the like, automobiles, boats, airplanes, railroad cars, military vehicles, dog sleds, and any type of similar vehicles drawn by beasts of burden, and the like with such a fastener including a post adapted to be more or less permanently affixed to a vehicle or other body, said post being able to accommodate attachment points integral to a variety of items either individually or in combination. Said post being designed and constructed in any one of a variety of non-cylindrical shapes having a plurality of sides, said sides each having integral to them grooves of equal dimensions. Said post also having integral to it a plurality of surfaces which angle inward and upward from a point on said sides above said grooves, said angled surfaces forming a frusto-pyramidically shaped portion at the top of which an axially arranged cavity is aligned, said cavity and said frusto-pyramidically shaped portion forming a head portion of said post. Said post also having a body defined as the area below said grooves. Said post also having a base, said base being disposed opposite said head portion.

This invention also resides in a catch, or device incorporating such a catch, adapted to be releasably assembled with said post. Said catch having integral to it a receiver portion. Said receiver portion provides a receiver cavity which is defined by a top wall, and more specifically a lower surface of said top wall, said top wall having a periphery from which downwardly extend a plurality of lateral walls, said lateral walls each having an inner side which angles inward and upward toward a central blind bore through which extends a vertically slidable locking bayonet. Said locking bayonet having a widened bottom portion which matingly fits into said cavity of the head portion of said post when said catch and said post are in assembly, thereby preventing said catch unit and said post unit from becoming disassembled. Said lateral walls each having an inwardly extending track. Said lateral walls provide, where absent, a laterally-facing mouth. Said inwardly extending tracks, provide where absent a slot which extends inward from said laterally-facing mouth and which is defined by two generally parallel tracks and one or more connecting tracks. Said catch also being designed and constructed such that the lower surface formed by the plurality of said lateral walls is angled downward toward the base of said post, away from said laterally-facing mouth toward the most opposite of said lateral walls. Said catch being designed and constructed of such a size that said head portion can be moved laterally into and out of said cavity through said laterally-facing mouth such that said tracks freely extend into said grooves. Said post being of adequate length to accommodate attachment portions of a variety of items to be secured to vehicles therewith including racks, brackets, cleats, blocks and the like either individually or in combination, either with or without the use of spacers placed over said post to provide the appropriate downward tension on the aforementioned items.

BACKGROUND-DESCRIPTION OF PRIOR ART

Traditionally, the aforementioned items are secured to vehicles either using prior art devices or by means of sheet metal screws and special tools. Securing by means of sheet metal screws and special tools is disadvantaged in that items can be easily stolen with the use of a pry-bar to rip the sheet metal at the point of attachment. Also, securing by this means is further disadvantaged in that oxidation and corrosion inevitably occur at the points of attachment resulting in permanent damage to the vehicle. Also, this means of securing is still further disadvantaged in that it requires special tools. Also, securing by this means is still further disadvantaged in that frequent removal of items invariably weakens the sheet metal at the point of attachment resulting in a progressively degenerating juncture. Also, securing by this means is still further disadvantaged in that the process is unduly complicated and unduly time consuming, therefore dissuading the process and limiting and decreasing the vehicle's maximum utility. The prior art discloses several fastening devices. However, the prior art devices used to secure tool boxes, cleats, and the like generally are of the sheet metal screws and special tools type.

Camper shells and the like are generally fastened to pickup trucks either by means of sheet metal screws and special tools or by means of a variety of clamps incorporating threaded bolts. These means are, however, disadvantaged in that they are neither able to accommodate tool boxes nor other types of racks. These means are further disadvantaged in that they are not universally adaptable to all manufacturers, models, and types of vehicles. These means are still further disadvantaged in that they require significant alteration to other standard products. For example, large, unsightly holes are required to be drilled in bed liners, a standard, commercially widely-available product, to accommodate said clamps. Such holes promote condensation and corrosion of the pickup truck bed.

The prior art discloses several systems for securing an assortment of specific cleats and the like to pickup trucks. However, such specific cleats are attachable only by means of prior art devices are not universal and are limited in that they are designed for specific manufacturers, models, and types of vehicle.

The prior art also includes devices for securing a variety of racks and brackets to vehicles by means of a variety of clamps and threaded bolts. However, such prior art devices are disadvantaged in that means are specific to each particular rack system and incapable of accommodating other racks, other brackets, tool boxes or camper shells. These means are generally dependent upon the vehicle's rain gutter or other like structural member and therefore further disadvantaged by this dependence.

DETAILED DESCRIPTION OF THE PREFERRED EMBODIMENTS

Referring now to FIGS. 1 to 8 the releasable, modular, multi-use fastener 1 of the present invention may be considered as consisting of two separate units, a catch unit 2 and a post unit 3 which may be readily placed into and out of locking assembly.

FIGS. 1 to 4 show an application of a fastener embodying the present invention 1 directed to the use of a plurality of identical fasteners each embodying the present invention in securing a variety of items to a bed wall rail 63 of a pickup truck 60.

Figure 1:
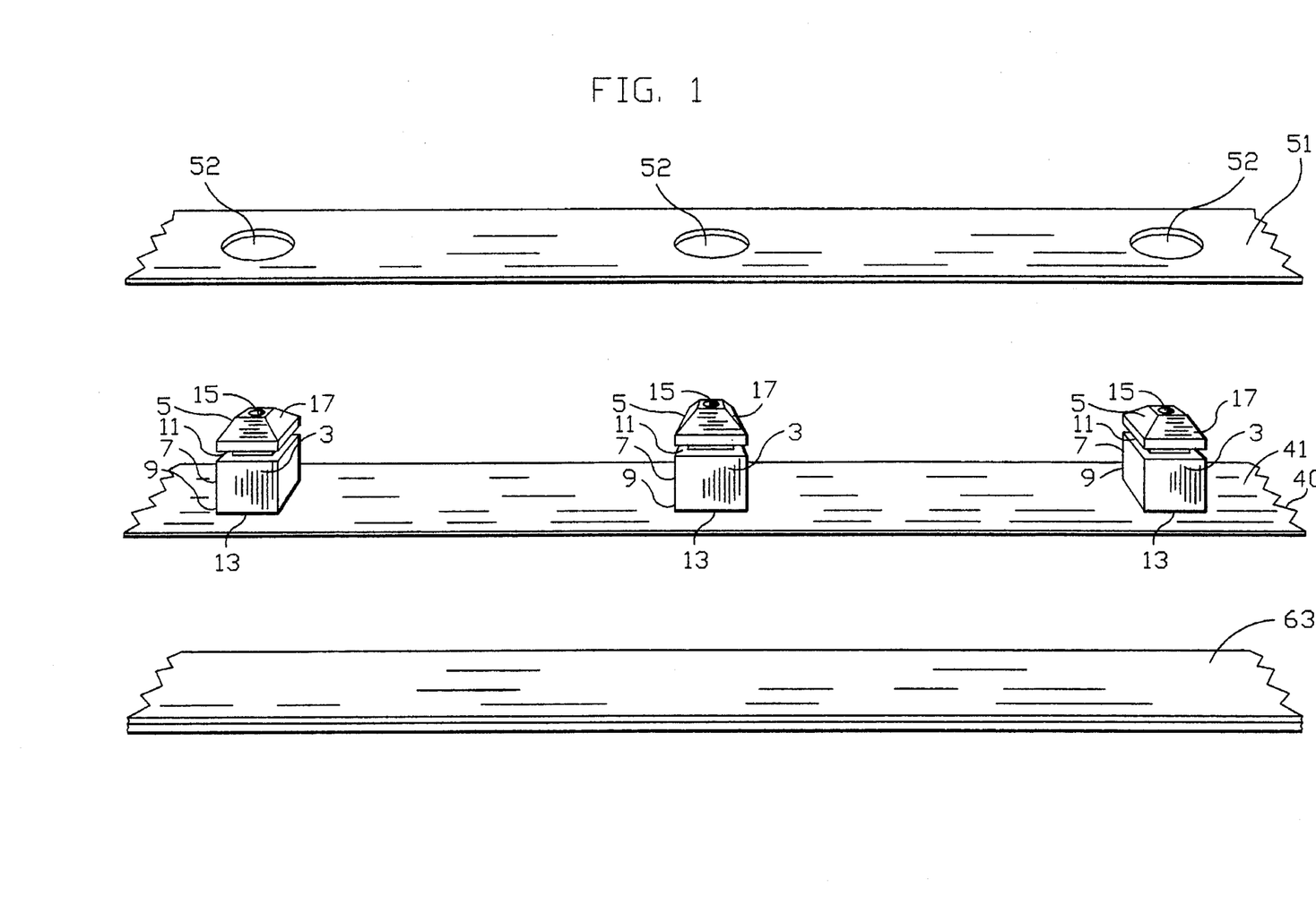
FIG. 1 is a perspective expanded view of a segment of a pickup truck bed wall rail, a segment of a bed liner bed wall rail cover, and a segment of a mounting plate which illustrates the manner in which a plurality of the identical post units of the fastener of the present invention are mounted on the bed wall rail.

FIG. 1 shows said plurality of identical post units 3 of the present invention more or less permanently affixed to a mounting plate 40, and more specifically to an upper surface 41 of said mounting plate 40 which rests between the top of a bed wall rail of a pickup truck 63 and a bed wall rail cover 51 of a bed liner 50. Said mounting plate 40 is so long as to be able to accommodate a plurality of the identical fasteners 1 along the length of a bed wall rail 63. The number is selected according to the pickup truck bed length 61. Said mounting plate 40 also having a preselected thickness and width so as not to interfere with the normal installation of said bed liner 50. Identical configurations are mounted on both the fight-hand and left-hand bed wall rails 63. Said bed wall rail cover 51 being modified to accommodate said mounting plate 40 and said plurality of said post units 3 affixed thereon by drilling a series of holes 52 therethrough of adequate diameter such that each post unit 3 can freely extend therethrough, yet not so large as to excessively expose the mounting plate 40. Bed liners 50 in this application, are a standard, commercially widely-available product common to the pickup truck aftermarket.

The fastener of the present invention in this configuration is advantaged over the prior art in that it enables the user to interchangeably attach a variety of items without causing permanent damage to the vehicle.

Figure 2:
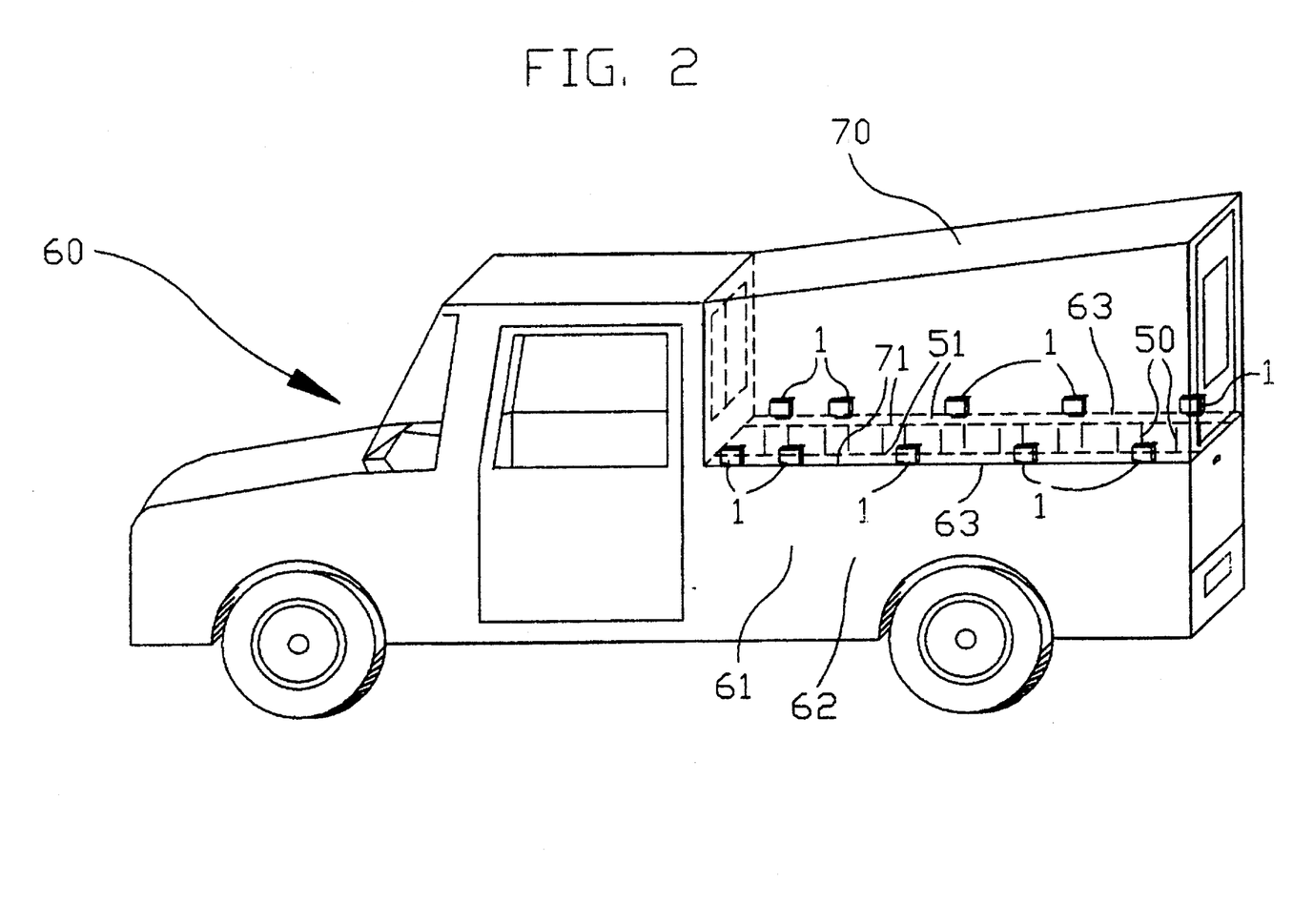
FIG. 2 is a cutaway perspective view of a pickup truck showing a camper shell secured by a plurality of identical fasteners each embodying the present invention.

FIG. 2 shows a camper shell 70 secured with a plurality of identical fasteners 1 each embodying the present invention. Said camper shell 70 is modified to accommodate said plurality of identical post units 3 by drilling a series of holes (not shown) through a rail portion (not shown) thereof of adequate diameter such that each post unit 3 can freely pass through, yet not so large as to permit the catch unit 2 to pass through in a manner analogous to that described above.

Figure 3:
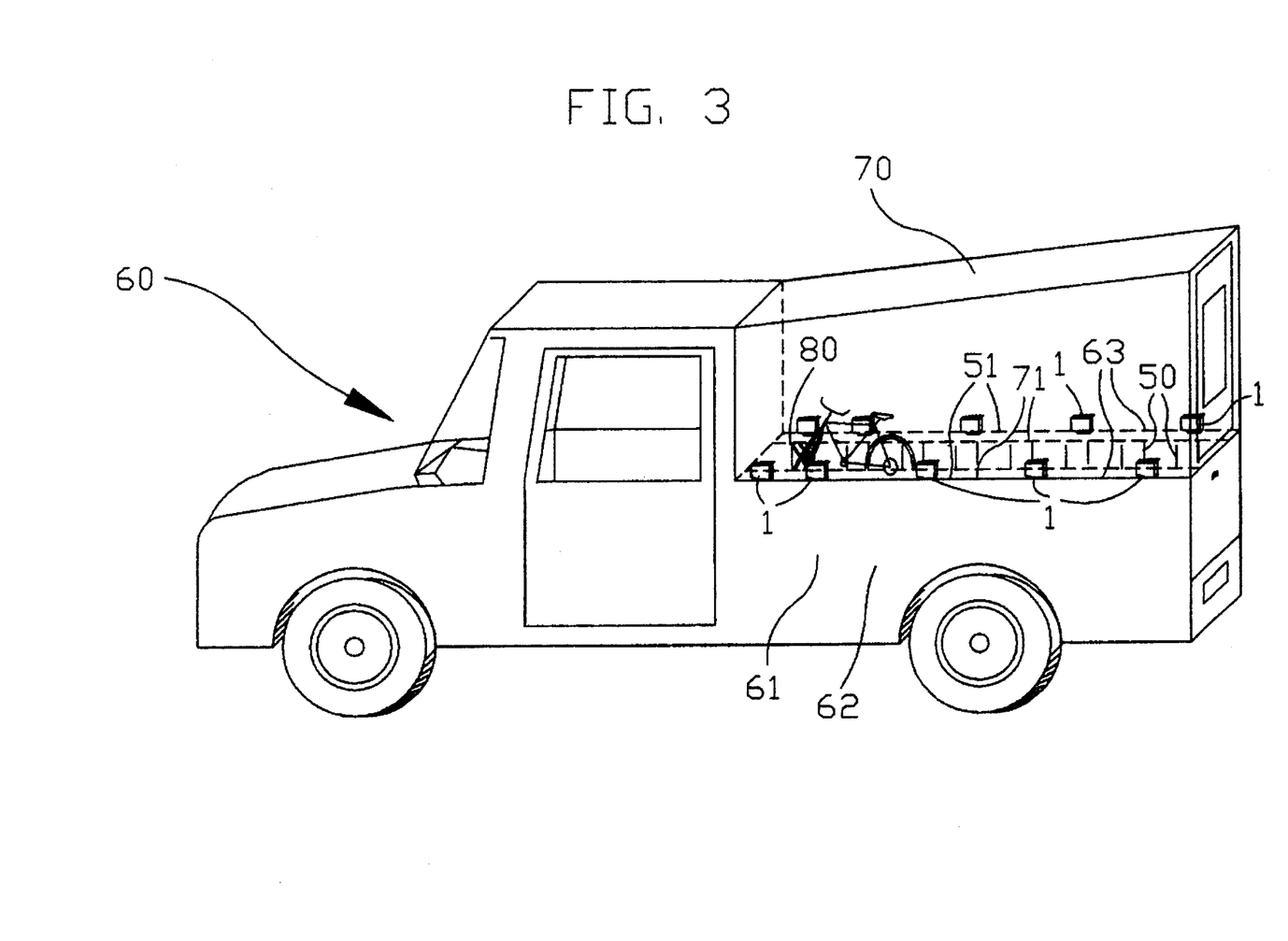
FIG. 3 is a cutaway perspective view of the pickup truck in FIG. 2 showing both a camper shell and a bracket designed to transport bicycles secured simultaneously to the pickup truck by means of a plurality of identical fasteners each embodying the present invention.

FIG. 3 shows both a bicycle rack 80 and a camper shell 70 simultaneously secured to the pickup truck with a plurality of identical fasteners 1 each embodying the present invention. Again, said camper shell 70 is modified as described above to accept said post units 3.

Figure 4:
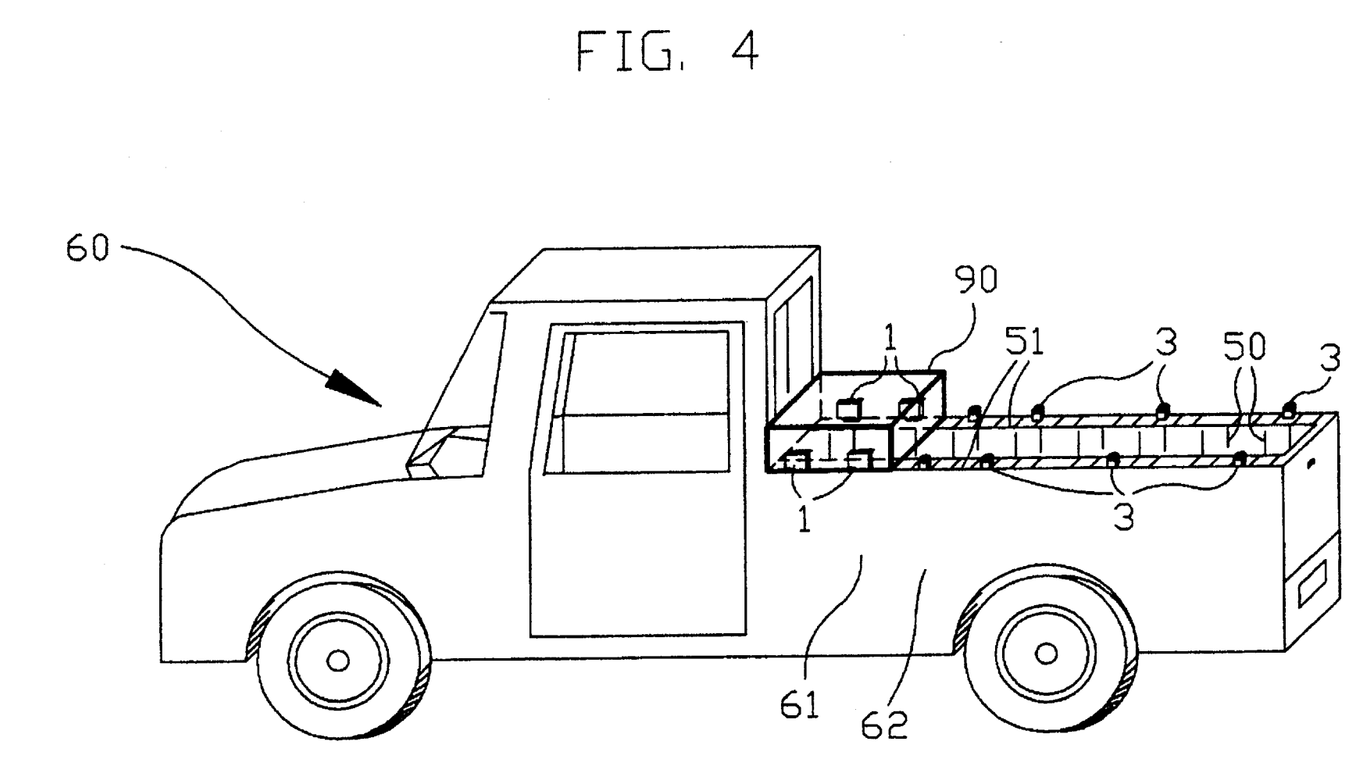
FIG. 4 is a cutaway perspective view of the pickup truck in FIGS. 2 and 3 showing a tool box secured to the pickup truck by means of a plurality of identical fasteners each embodying the present invention. Post units of the present invention are shown affixed to the mounting plate and in disuse toward the rear of the vehicle.

FIG. 4 shows a carpenter's tool box 90 secured with a plurality of identical fasteners 1 each embodying the present invention. Post units 3 in disuse are also shown toward the rear of the vehicle. Said tool box 90 is modified to accommodate said plurality of identical post units 3 by drilling a series of holes (not shown) in the bottom surface of said tool box (not shown) of adequate diameter such that each post unit 3 can freely pass through in a manner analogous that described above in securing said camper shell 70 to said pickup truck.

The aforementioned items can be secured quickly and easily, without the use of special tools, interchangeably, individually or in combination, showing advantages both over securing by traditional means of sheet metal screws and special tools and by means of prior art devices which incorporate clamps with threaded bolts. It is to be fully understood, however, that this invention may be readily and advantageously employed without said mounting plate 40 or said bed liner 50 in releasable fastening a variety of other items including brackets for other uses, a variety of blocks, and the like, cleats, and the like to walls, floors or other structural surfaces of pickup tracks and a variety of other vehicles.

For example, a plurality of fasteners each embodying the present invention can be more or less permanently affixed to dog sleds which regularly transport assorted cargo and passengers. The present invention is advantaged over the prior art devices in that brackets, cleats, and other assorted attachments can be secured both individually and simultaneously given the specific requirements of cargo and passengers.

As will be apparent to persons skilled in the art, the apparatus of this invention may be readily employed in other locales for the purposes indicated.

For purposes of this disclosure, the fastener 1 is shown in greater detail in FIG. 1 and in FIGS. 5 to 8. The post unit 3 of the present invention is conceivably constructed in any one of a number of non-cylindrical shapes having a preselected number of sides. However, for purposes of these drawings, said post unit 3 is pictured in a generally rectangular form. Said post unit 3 having a base 13, said base 13 being affixed in a more or less permanent manner to a vehicle, or in this embodiment, to a mounting plate 40 which rests between said bed wall rail 63 and said bed wall rail cover 51.

It is, of course, understood, that said post units 3 may also be detachably mounted on said mounting plate 40 or any other type of base (not shown) by a threaded or any other type of detachable connection.

Figure 7:
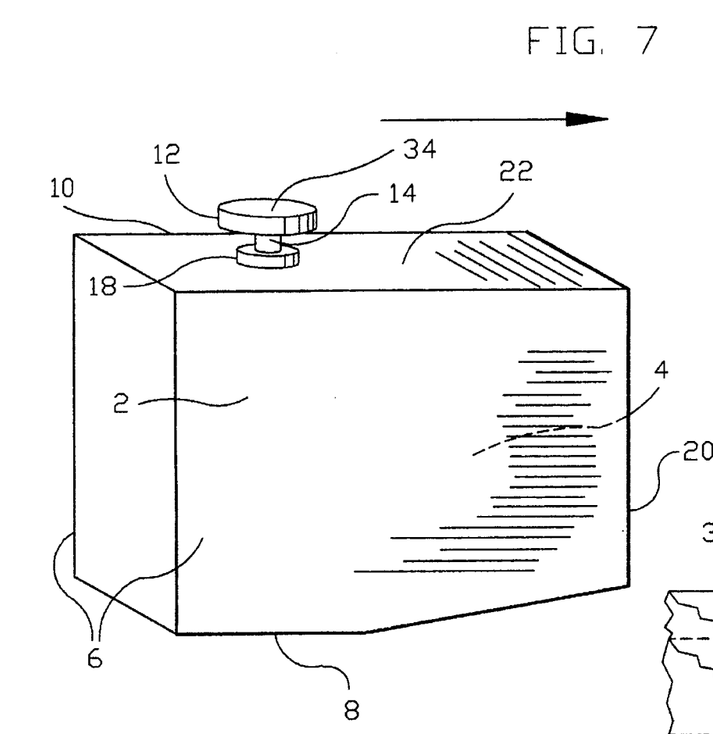
FIG. 7 is a perspective view of the post unit of the fastener of the present invention shown in FIG. 1, FIG. 5 and FIG. 6.

Said post unit 3 having a body 7 constructed of a plurality of sides 9, said sides 9 each having therein machined a groove 11 of identical dimensions. Said sides 9 being defined by that portion between said base 13 on the lower end and by said groove 11 on the upper end of the body 7. Said post unit 3 having a frusto-pyramidically shaped head 5, said head 5 being defined as that portion above said grooves 11 consisting of a plurality of angled surfaces 17 which together form frusto-pyramidal portion 19 which angles inward and upward toward a central cavity 15. Said post unit 3 also being of predetermined length so as to receive over it a variety of items to be attached therewith below the level defined by said grooves 11.

Figure 8:
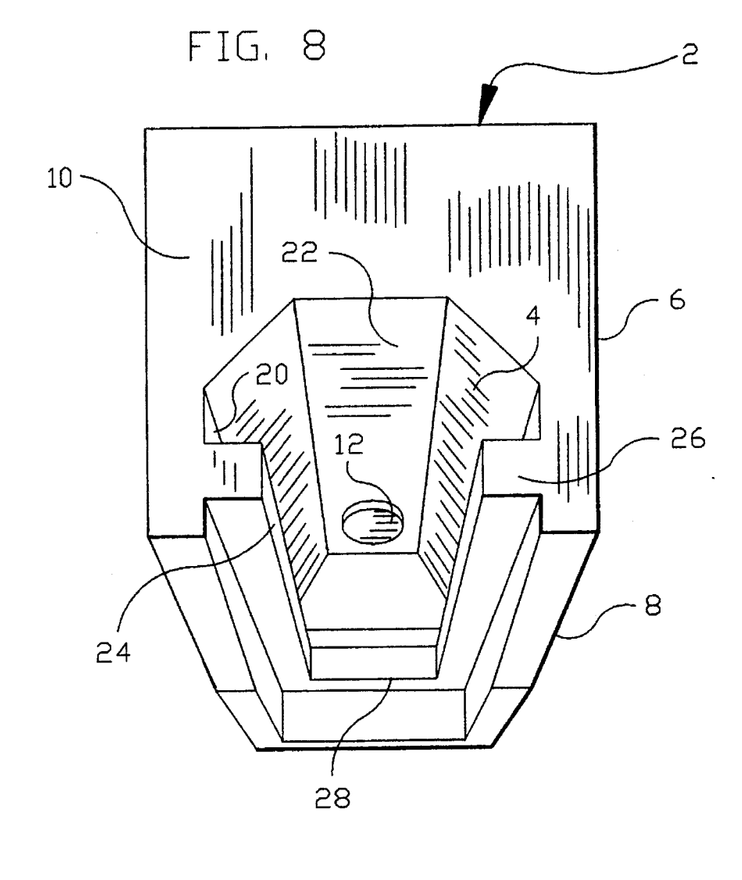
FIG. 8 is a perspective view of the catch unit of the fastener of the present invention shown in FIG. 1, FIG.5 and FIG. 6. This view is taken looking upward, through the laterally facing mouth into the receiver cavity.
Figure 9:
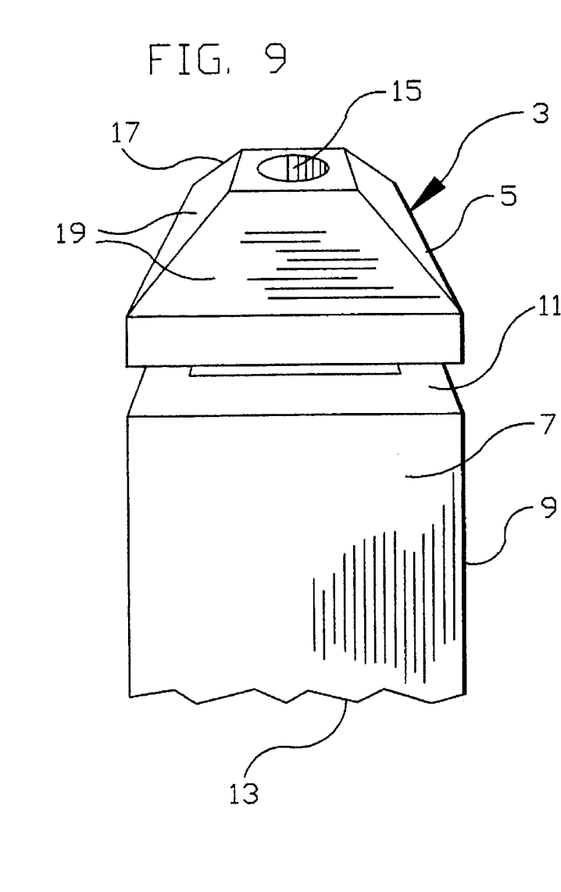
FIG. 9 is a perspective exploded view of the fastener of the present invention as shown in FIG. 5 and FIG. 6.

Referring to FIGS. 7 and 8, the catch unit 2 includes a receiver cavity 4 and a vertical portion 10. The receiver cavity 4 is defined by a top wall 22, a plurality of lateral walls 6, a plurality of inwardly extending parallel tracks 26 and one or more integral inwardly extending connecting tracks 28 integrated with walls 6. Said lateral walls 6 extend downward from said top wall 22 for less than the full periphery, so as to provide, where absent, a laterally facing mouth 20. Said parallel tracks 26 and connecting tracks 28, provide, where absent, a slot 24 which extends inwardly from said mouth 20. Said receiver cavity 4 being of such size as to matingly accommodate said head portion 5, such that said head portion 5 is movable into and out of said cavity 4 through said mouth 20, and such that said parallel tracks 26 simultaneously extend into said post grooves 11 on opposite sides of said post unit 3, and such that at the point of full assembly said connecting tracks 28 are received into said post grooves 11.

Figure 5:
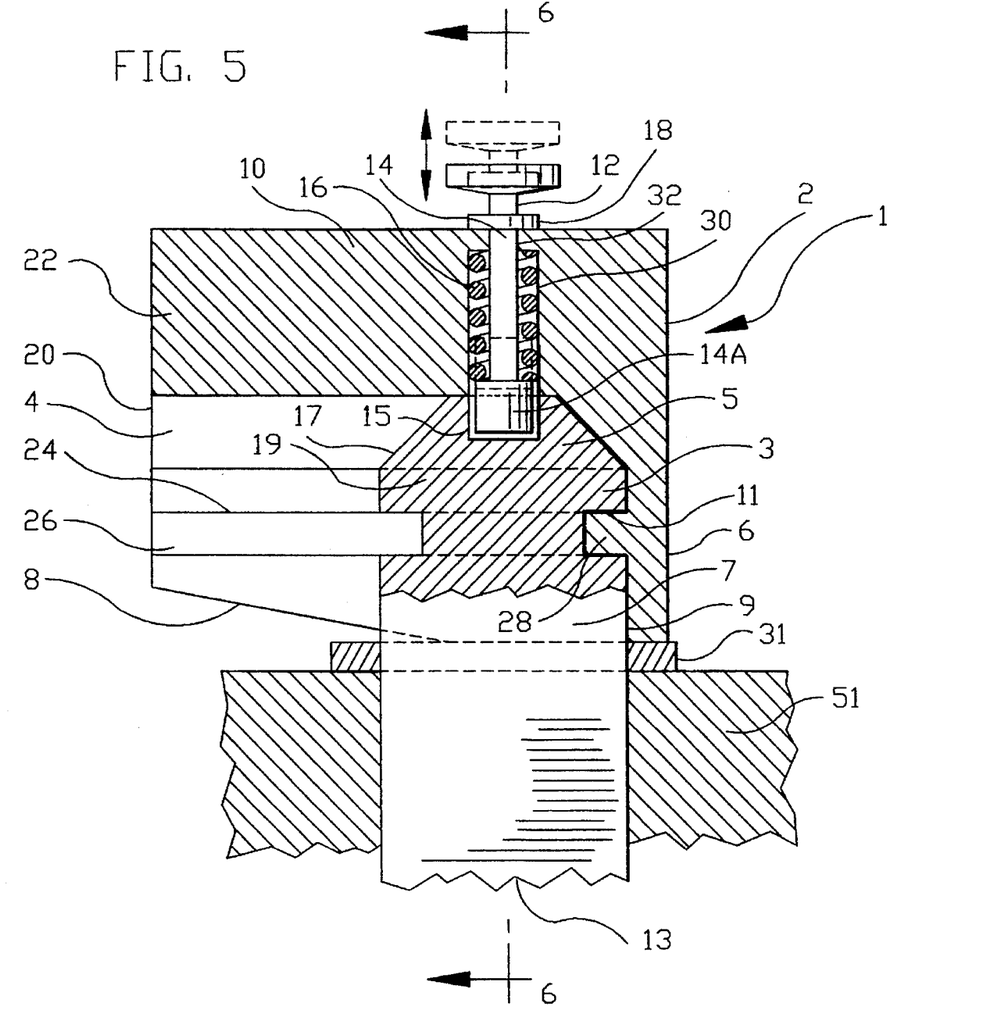
FIG. 5 is a cross section of the assembled fastener of the present invention.
Figure 6:
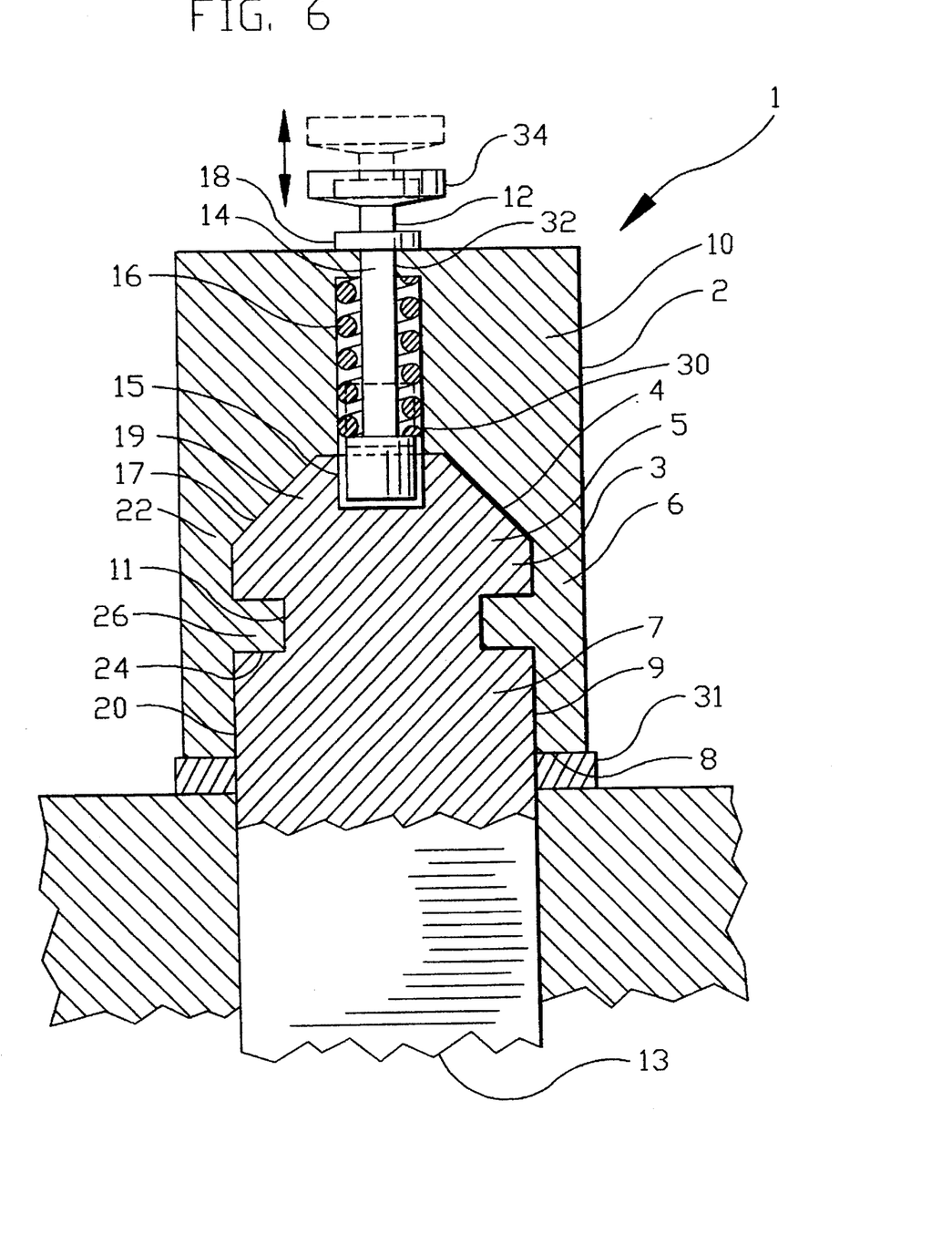
FIG. 6 is a cross section of the assembled fastener of the present invention along section lines 6—6 in FIG. 5 and FIG. 9.

FIG. 5 shows a cross section of the preferred embodiment of the present invention showing said post unit 3 and said catch unit 2 in full assembly. Said vertical portion 10 houses therein a locking bayonet 12, said locking bayonet 12 being comprised of a shank 14 and a snap ring 18 carried by and axially fixed to said shank 14 which defines a lower limited position of said locking bayonet 12. Said shank 14 having a wider, lower portion 16 which is adapted to matingly protrude into cavity 15 of said head portion 5 of said post unit 3. Said vertical portion 10 also having a lower bore 30 which slidable receives said locking bayonet 12 and a smaller diameter upper bore 32 the walls of which engage said snap ring 18 so as to act as a limit stop with respect to its downward movement. Said locking bayonet also having a knob 34 which provides a convenient means to grasp and thereby manually move said locking bayonet 12 from its lower limited position to its upper limited position at which it no longer protrudes with the portion 16 into cavity 15. A spring 36 which circumscribes said shank 14 biases said locking bayonet 12 to its lower limited position. Other embodiments of the present invention substitute a key-locking bayonet mechanism for said spring-biased locking bayonet.

Said locking bayonet 12 being arranged such that when said post unit 3 and said catch unit 2 are moved into assembly, said locking bayonet 12 engages one of said angled surfaces 17 of said post unit head 5 in a manner such that the angled surface 17 acts like a cam which slidably moves said locking bayonet 12 to its upper limited position. At the point of full assembly, said locking bayonet 12 is immediately and easily released such that said lower portion 16. Also, at the point of full assembly, said connecting tracks 28 are received into said post unit grooves 11.

Said catch unit 2 and said post unit 3 are held in full assembly by the combination of said tracks 26 and 28 being received into said grooves 11 and said lower portion 16 of said locking bayonet 12 being received into said cavity 15.

FIGS. 7 and 8 show a lower surface 8 of said lateral wall 6 of said catch unit 2, said lower surface 8 being angled downward away from said laterally-facing mouth 20 toward the most opposite lateral wall 6, and said lower surface 8 leveling out at a point such that when said cooperating units 2 and 3 are in full assembly, said lower surface 8 evenly engages the upper surface of items being attached or the upper surface of spacers 31 placed thereover. Depending upon the thickness of the items being secured by the fastener, it may be necessary to place such a spacer 31 over said post unit body 7 after items to be secured are placed thereon to insure the correct downward pressure exerted by the cooperating units 2 and 3. In the preferred embodiment, spacers 31 would be used in FIG. 4 to attach said tool box 90 and in FIG. 2 to attach said camper shell 70, but not in FIG. 3 to attach both said camper shell 70 and said bicycle rack 80 simultaneously.

To disassemble said fastener 1, said locking bayonet 12 is manually moved to its upper limited position while simultaneously sliding said catch unit 2 in a lateral direction opposite to that originally used to bring said cooperating units 2 and 3 into assembly. Also, when disassembling, the downward pressure exerted by the fastener 1 while in assembly is released.

I claim:

1. A releasable, modular, multi-use fastener for detachably securing a variety of items, to a vehicle, comprising a post unit having a plurality of sides each of which has integral to it a groove, a frusto-pyramidically shaped portion above said groove, a central cavity, said post being adapted to be affixed to a vehicle, and a catch adapted to be lockably assembled with and released from said post, comprising a receiver portion and a plunger, said receiver portion having a cavity which is defined by a top wall, said top wall having an undersurface, a plurality of lateral wales, and a plurality of internally extending tracks integral to said lateral walls, said lateral walls extend downward from said undersurface of said top wall so as to provide a laterally-facing mouth, said internally extending tracks provide a slot which extends inwardly from said laterally-facing mouth said catch also being designed and constructed such that the lower surface formed by the plurality of said lateral walls is angled downward away from said laterally-facing mouth and toward the most opposite of said lateral walls, said catch being designed and constructed of such a size that said head portion of said post can be moved laterally into and out of assembly through said laterally-facing mouth and such that said tracks of said receiver portion are spaced from one another only slightly greater than the width of said grooves, said post being of adequate length to accommodate a variety of items to be attached to the vehicle by means of the fastener.

2. A releasable, modular, multi-use fastener as described in claim 1, further characterized by said angled-downward lower surface engages and exerts downward pressure to secure items being attached to the vehicle.

3. A releasable, modular, multi-use fastener as described in claim 1, further characterized by said post unit being affixed to a vehicle's surface.

4. A releasable, modular, multi-use fastener as described in claim 3, wherein the connection is a threaded connection.

5. A releasable, modular, multi-use fastener as described in claim 3, further characterized by a post unit which is affixed to a vehicle's surface via a mounting plate.

6. A releasable, modular, multi-use fastener as described in claim 5, wherein the connection is a threaded connection.

7. A releasable, modular, multi-use fastener, comprising in combination, a) a post unit, said post unit having a non-circular cross-section and a frusto-pyramidically shaped top portion which has a centrally aligned cavity at its top; said post unit being adapted to be received through an opening of a member which is attached to said post unit;

b) a catch unit having walls which define a cavity which is matingly shaped relative to said post unit, said cavity includes a lateral opening through which the portion of said post unit which extends through said opening can be laterally inserted;

c) said walls include a top wall having a bore which is coaxially aligned when said frusto-pyramidically shaped top portion of said post unit has been fully laterally inserted relative to said cavity; and d) a locking bayonet having a shank and a widened lower portion, said locking bayonet being slidably mounted in said bore and being movable between a locked position and a released position, said widened lower portion extending into said cavity in said frusto-pyramidically shaped portion of said post when said locking bayonet is in the locked position, and said widened lower portion being manually removed from said cavity in said frusto-pyramidically shaped portion when said locking bayonet is in the released position.

8. A releasable, modular, multi-use fastener as described in claim 7, including a coil spring coaxially mounted on said shank of said locking bayonet to bias said bayonet into said locked position.

* * * * *